(12) United States Patent
Hsu

(10) Patent No.: US 8,047,732 B2
(45) Date of Patent: Nov. 1, 2011

(54) MECHANICAL SHUTTER AND CAMERA MODULE HAVING SAME

(75) Inventor: Hsueh-Feng Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/795,830

(22) Filed: Jun. 8, 2010

(65) Prior Publication Data

US 2011/0135296 A1    Jun. 9, 2011

(30) Foreign Application Priority Data

Dec. 8, 2009  (CN) ................. 2009 1 0311076.5

(51) Int. Cl.
*G03B 9/36* (2006.01)
(52) U.S. Cl. ...................................... 396/463; 396/462
(58) Field of Classification Search .................. 396/451, 396/462, 463, 465, 484, 489, 491, 492
See application file for complete search history.

(56) References Cited

U.S. PATENT DOCUMENTS

| | | | | |
|---|---|---|---|---|
| 4,313,659 A * | 2/1982 | Saito et al. | ..................... | 396/463 |
| 4,890,129 A * | 12/1989 | Mody | ............................ | 396/463 |
| 2011/0150456 A1* | 6/2011 | Hsu | ............................... | 396/448 |

* cited by examiner

*Primary Examiner* — W. B. Perkey
(74) *Attorney, Agent, or Firm* — Altis Law Group, Inc.

(57) ABSTRACT

An exemplary mechanical shutter includes a barrel, a first blade, a second blade, a third blade, a magnet, and a magnetic field generator. The barrel defines a through hole and an aperture in the hole. The first blade is arranged in the hole and mounted on the barrel. The second blade is slidably mounted on the first blade. The third blade is slidably mounted on the second blade. The magnet is attached to the third blade. The magnetic field generator is mounted on the fixture and spatially corresponding to the magnet. The magnetic field generator applies a magnetic field to the magnet. The magnet and the magnetic field generator cooperatively move the blade group between an extended position and an retracted position.

20 Claims, 5 Drawing Sheets

MECHANICAL SHUTTER AND CAMERA MODULE HAVING SAME

BACKGROUND

1. Technical Field

The disclosure generally relates to mechanical shutters, and particularly, to a camera module using the mechanical shutter.

2. Description of Related Art

A typical mechanical shutter includes a motor, a driving shaft, and a spring. It is, however, difficult to achieve reduction in the size of such mechanical shutters.

Therefore, what is needed is a mechanical shutter that can overcome the described limitations, and the camera module using the mechanical shutter.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present camera module. Moreover, in the drawings, all the views are schematic, and like reference numerals designate corresponding parts throughout the several views.

DETAILED DESCRIPTION

Embodiments of the camera module equipped with a mechanical shutter will now be described in detail below and with reference to the drawings.

Figure 1:
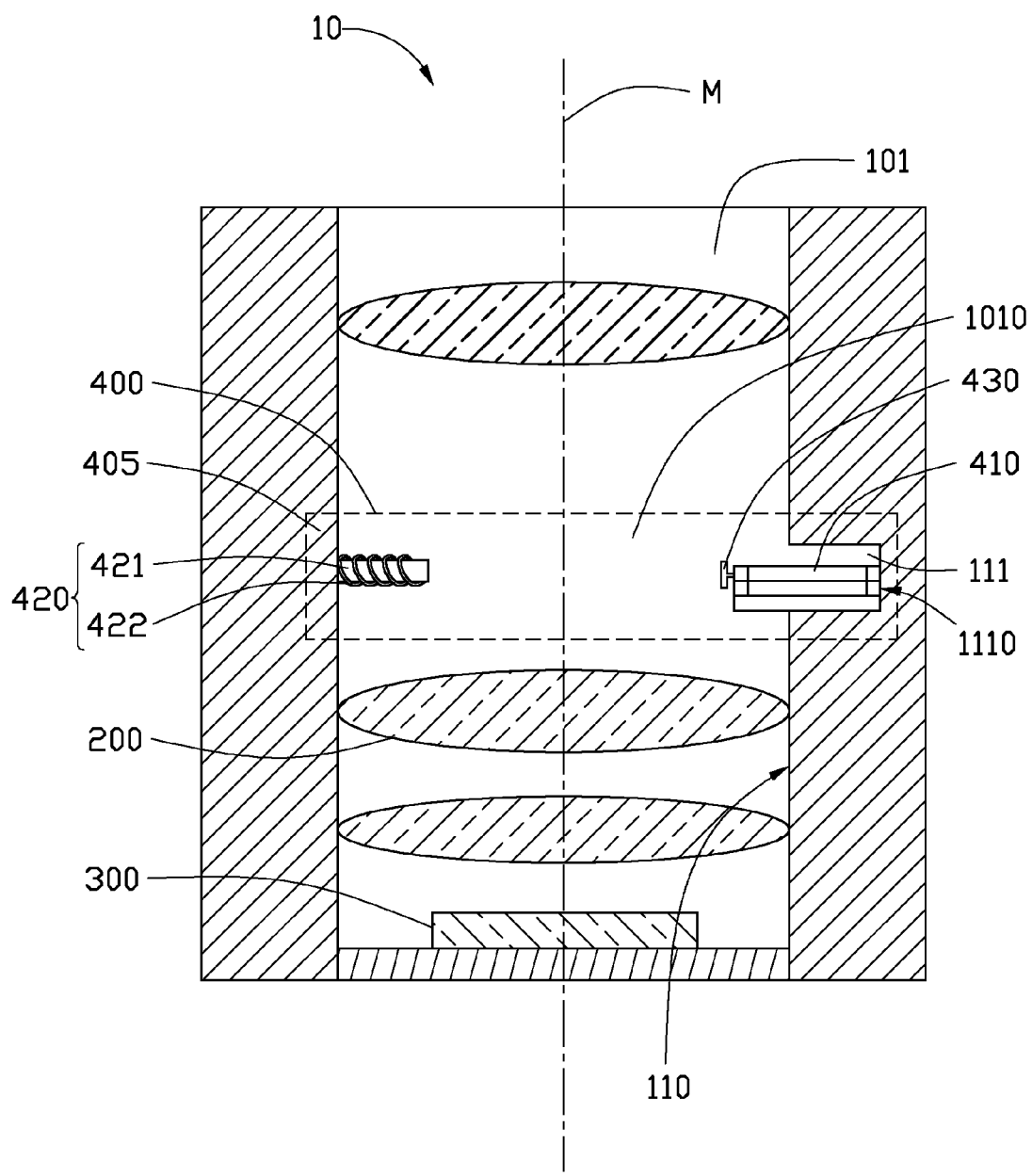
FIG. 1 is a sectional view of a camera module in accordance with an exemplary embodiment, showing a mechanical shutter including a blade group being employed therein.
Figure 2:
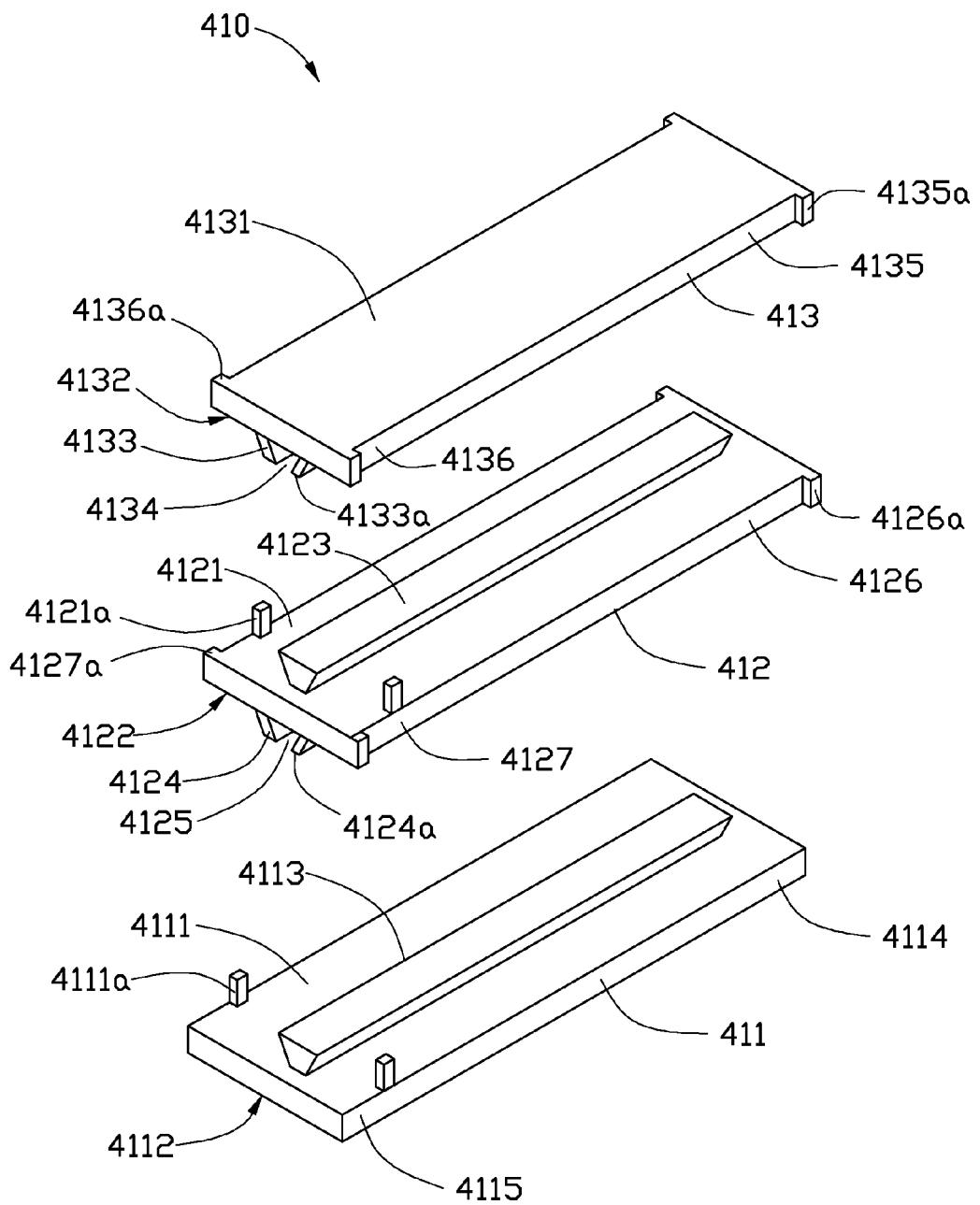
FIG. 2 is an exploded, isometric view of the blade group of FIG. 1.

Referring to FIGS. 1 and 2, a camera module 10 in accordance with an exemplary embodiment is shown. The camera module 10 includes a number of lenses 200, an image sensor 300 facing the lenses 200, and a mechanical shutter 400. The mechanical shutter 400 includes a fixture, a blade group 410, a magnetic field generator 420, and a magnet 430. In this embodiment, the mechanical shutter 400 is configured to control exposure of light passing through the lenses 200 to the image sensor 300.

In this embodiment, the fixture can be a lens barrel 405. The barrel 405 is generally cylindrical, and has a central axis M. In addition, the barrel 405 has a through hole 101 defined therein. The hole 101 extends along the central axis M. The lenses 200 are received in the hole 101 of the barrel. Moreover, the barrel 405 includes an inner surface 110 in the hole 101, and a recess 111 defined in the inner surface 110, and an interior surface 1110 in the recess 111.

The blade group 410 includes a first blade 411, a second blade 412, a third blade 413, a first elongated protruding portion 4113, a second elongated protruding portion 4123, a first engaging portion 4124, and a second engaging portion 4133. In this embodiment, the first, the second, and the third blades 411, 412, and 413 can be made of steel and are rectangular. The second blade 412 is arranged between the first blade 411 and the third blade 413.

The first blade 411 includes a first top surface 4111 and a first bottom surface 4112 at two opposite sides thereof. In particular, the first top surface 4111 and the first bottom surface 4112 are substantially parallel to each other. In this embodiment, the first blade 411 includes a first end 4114 and an opposite second end 4115. The first end 4114 is attached to the interior surface 1110 and received in the recess 111. The first protruding portion 4113 protrudes from the first top surface 4111, and extends from the first end 4114 to the second end 4115. A cross second of the first protruding portion 4113 can be triangle, or another suitable shape. In this embodiment, a cross section of the first protruding portion 4113 is trapezoidal, and the first protruding portion 4113 tapers in a direction toward the first blade 411. That is, one side of the first protruding portion 4113 facing away from the first top surface 4111 is wider than an opposite side of the first protruding portion 4113 adjacent to the first top surface 4111.

The blade group 410 may further include at least one, for example two first blocks 4111a arranged on the first blade 411. In this embodiment, the two first blocks 4111a protrude from the first top surface 4111 of the first blade 411, and are located adjacent to the second end 4115. In particular, the two first blocks 4111a are located at two opposite sides of the first protruding portion 4113.

The second blade 412 is similar to the first blade 411 in structure, and includes a second top surface 4121 and a second bottom surface 4122 at two opposite sides thereof. The second bottom surface 4122 faces the first blade 411. The second top surface 4121 faces away from the first blade 411. In this embodiment, the second blade 412 includes a third end 4126 and an opposite fourth end 4127. The second protruding portion 4123 protrudes from the second top surface 4121, and extends from the third end 4126 to the fourth end 4127. Similar to the first protruding portion 4113, a cross section of the second protruding portion 4123 is trapezoidal, and the second protruding portion 4123 tapers in a direction toward the second blade 412. That is, one side of the second protruding portion 4123 facing away from the second top surface 4121 is wider than an opposite side of the second protruding portion 4123 adjacent to the second top surface 4121.

The first engaging portion 4124 protrudes from the second bottom surface 4122 of the second blade 412, and is substantially parallel to the second protruding portion 4123. In this embodiment, the first engaging portion 4124 includes a first engaging surface 4124a facing away from the second bottom surface 4122. In addition, the first engaging portion 4124 has a first groove 4125 defined in the first engaging surface 4124a. The first groove 4125 generally extends the length of the second top surface 4121, and has a same shape as the first protruding portion 4113.

The blade group 410 may also include at least one second block 4121a, at least one first protrusion 4126a, and at least one second protrusion 4127a arranged on the second blade 412. This embodiment includes two second blocks 4121a but may include just one or more than two protruding from the second top surface 4121. The two second blocks 4121a are located adjacent to the fourth end 4127 of the second blade 412. Likewise this embodiment includes two but may include just one or more than two first protrusions 4126a protruding from opposing sides of the third end 4126. Additionally, just one or more than two second protrusion 4127a protrudes from opposing sides of the fourth end 4127. In particular, the two second blocks 4121a and the two first protrusions 4126a are located at two opposite sides of the second protruding portion 4123. The two second protrusions 4127a are also located at two opposing sides of the second protruding portion 4123.

Figure 3:
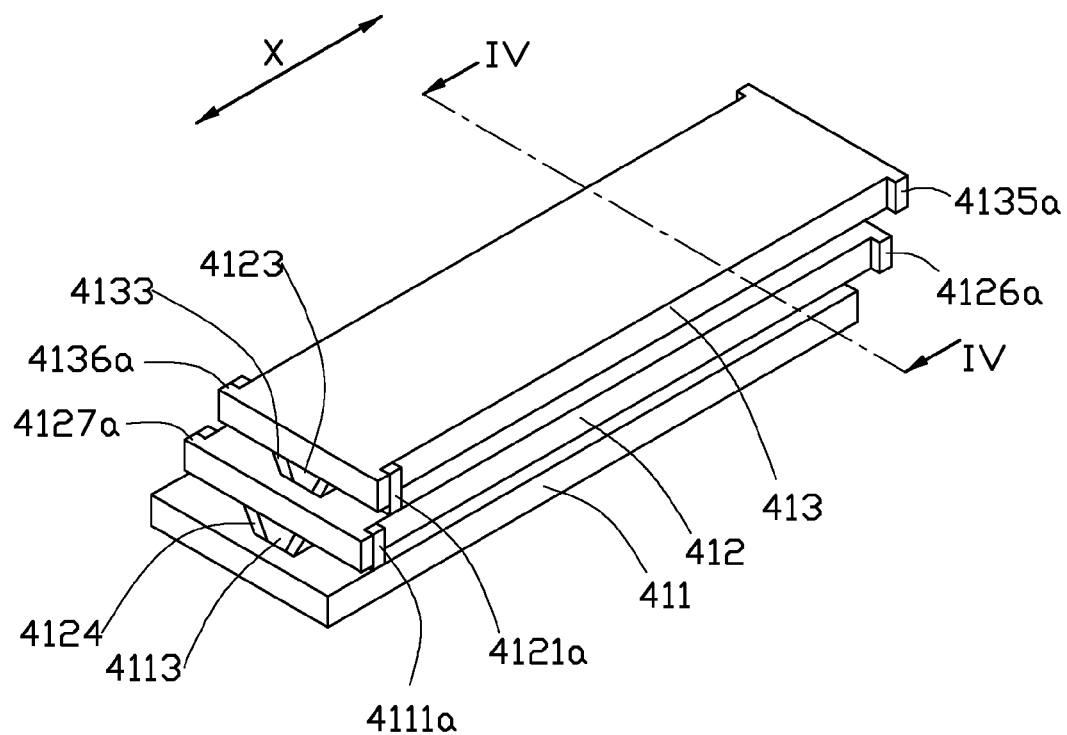
FIG. 3 is an isometric and assembled view of the blade group of FIG. 2.
Figure 4:
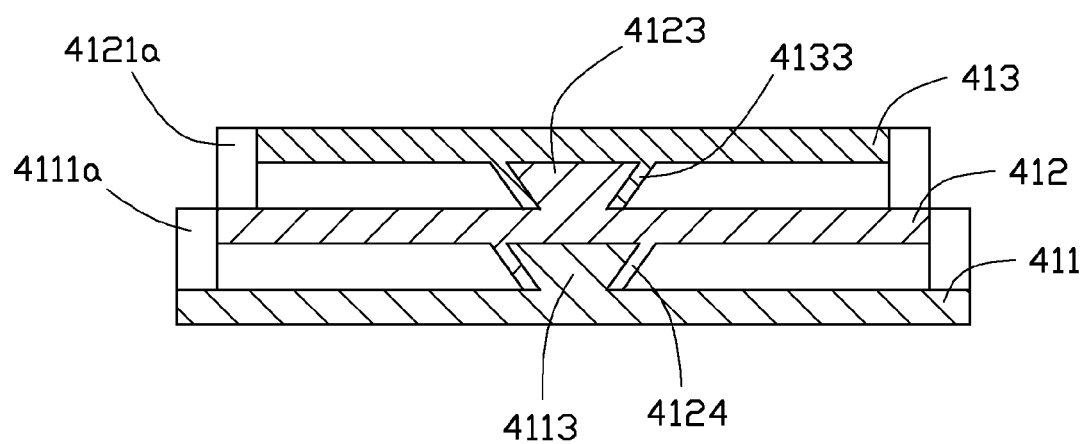
FIG. 4 is cross section of the blade group of FIG. 3, taken along line IV-IV.

Referring also to FIGS. 3 and 4, the first protruding portion 4113 can be engaged in the first groove 4125 of the first engaging portion 4124, thus the second blade 412 can be slidably attached to the first blade 411. In this embodiment, a width of the second blade 412 in a cross section thereof is equal to or less than a distance between the two first blocks 4111a. When the second blade 412 slides on the first blade 411, the two first blocks 4111a are located between the two first protrusions 4126a and the two second protrusions 4127a. In one typical application, the first blocks 4111a may abut against the second protrusions 4127a, thus preventing the second blade 412 from sliding further in a positive X-direction, as illustrated in FIG. 3. In another application, the first blocks 4111a may abut against the first protrusions 4126a, thus preventing the second blade 412 from sliding further in a negative X-direction as illustrated in FIG. 3.

The third blade 413 includes a third top surface 4131 and a third bottom surface 4132 at two opposite sides thereof. The third bottom surface 4132 faces the second blade 412. The third top surface 4131 faces away from the second blade 412. In this embodiment, the third blade 413 includes a fifth end 4135 and an opposite sixth end 4136. The second engaging portion 4133 protrudes from the third bottom surface 4132, and extends from the fifth end 4135 to the sixth end 4136. The second engaging portion 4133 includes a second engaging surface 4133a facing away from the third bottom surface 4132. In addition, the second engaging portion 4133 has a third groove 4134 defined in the second engaging surface 4133a. The third groove 4134 generally extends the length of the third top surface 4131, and has a same shape as the second protruding portion 4123.

The blade group 410 may further include at least one third protrusion 4135a, and at least one fourth protrusion 4136a arranged on the third blade 413. This embodiment includes two third protrusions 4135a but may include just one or more than two on opposing sides of the fifth end 4135. Likewise, this embodiment includes two but may include just one or more than two fourth protrusions 4136a protruding from opposing sides of the sixth end 4136. In particular, the third protrusions 4135a are located at opposite sides of the second engaging portion 4133. The fourth protrusions 4136a are also located at the opposite sides of the second engaging portion 4133.

The second protruding portion 4123 can be engaged in the second groove 4134 of the second engaging portion 4133, thus the third blade 413 can be slidably attached to the second blade 412. In this embodiment, a width of the third blade 413 in a cross section thereof is equal to or less than a distance between the two second blocks 4121a. When the third blade 413 slides on the second blade 412, the two second blocks 4121a are located between the two third protrusions 4135a and the two fourth protrusions 4136a. In one typical application, the second blocks 4121a may abut against the fourth protrusions 4136a, thus preventing the third blade 412 from sliding further along the positive X-direction, as illustrated in FIG. 3. In another application, the second blocks 4121a may abut against the third protrusions 4135a, thus preventing the third blade 412 from sliding further along the negative X-direction.

Referring to FIG. 1, the magnetic field generator 420 includes a magnetic core 421, and a electromagnetic coil 422 around the magnetic core 421.

In assembly, the magnetic field generator 420 is arranged in the hole 101 of the barrel 405 and faces the recess 111. The magnetic core 421 is fixed to the inner surface 110 of the barrel 405, and is generally perpendicular to the central axis M. The blade group 410 faces the magnetic field generator 420. The first end 4114 of the first blade 411 is attached to the interior surface 1110 of the barrel 405. Each of the first, second, and the third blade 411, 412, and 413 is parallel to the magnetic core 421. The magnet 430 is attached to the sixth end 4136 of the third blade 413 and faces the magnetic core 421. The magnet 430 for example, may be a permanent magnet or an electromagnet.

Figure 5:
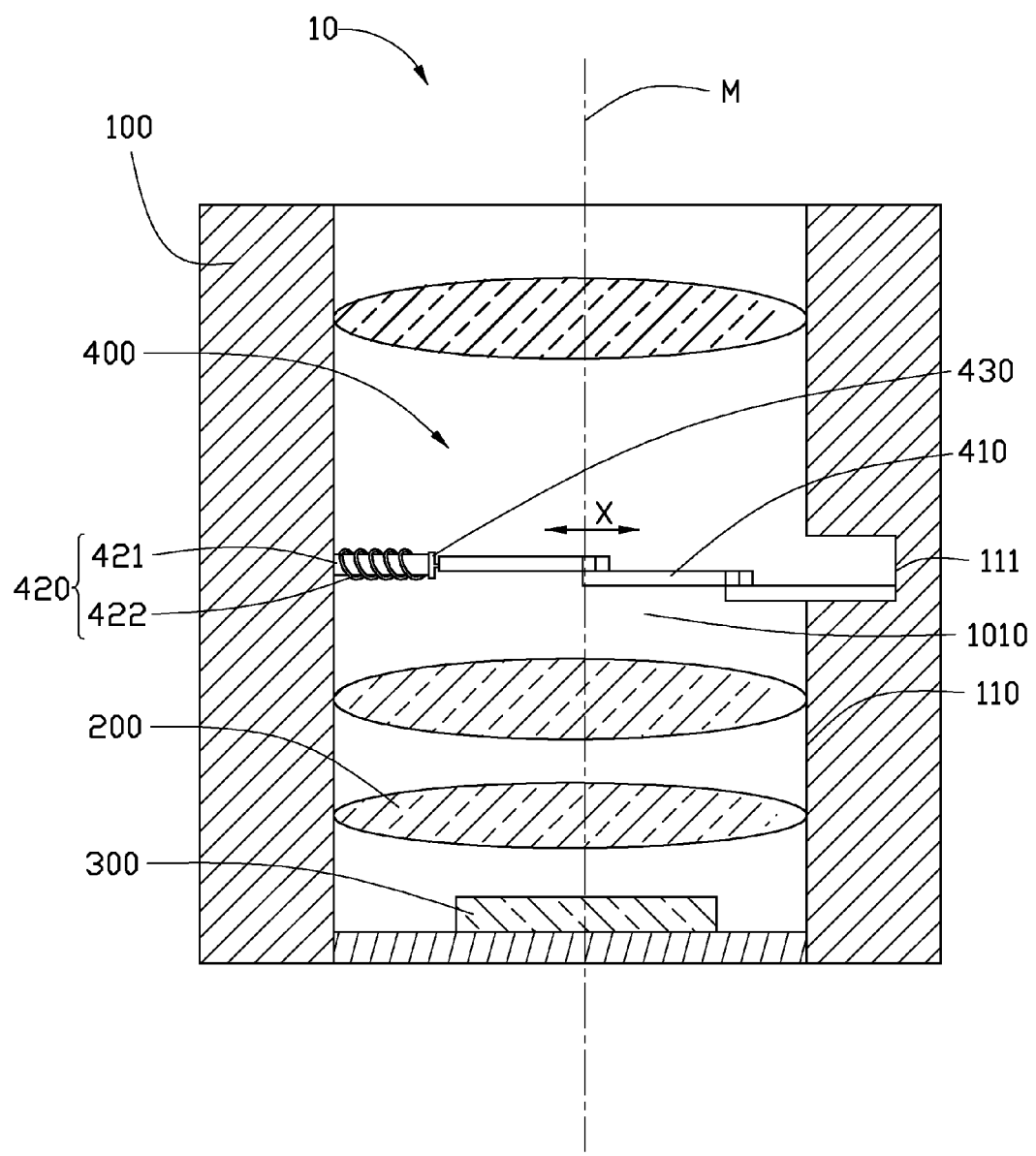
FIG. 5 is cross section of the camera module of FIG. 1, showing an aperture covered by the blade group of the mechanical shutter.

Referring to FIG. 5, the barrel 405 defines an aperture 1010 between the magnetic field generator 420 and the blade group 410. The aperture 1010 is located between the lenses 200. In operation, a current is applied to the magnetic core 421. The magnetic field generator 420 generates a magnetic field around the magnet 430. As such, an electromagnetic force is generated between either or both of the magnetic field generators 420 and the magnet 430. The magnet 430 is subject to electromagnetic force along an X-axis direction perpendicular to the central axis M. In particular, for the first magnet 230, the electromagnetic force may operate in positive or negative X-axis directions. In one typical application, when a positive current is applied to the magnetic core 421, the electromagnetic force moves the magnet 430 and the third blade 413 toward the magnetic field generator 420. During movement of the third blade 413, when the third protrusions 4135a abut against the second blocks 4121a along the positive X-axis direction, the third blade 413 pulls the second blade 412 toward the magnetic field generator 420 to a extended position. Thus the second blade 412 and the third blade 413 slide away from the first blade, and either or both of the second blade 412 and the third blade 413 cover(s) the aperture 1010. In another example, when a negative current is applied to the magnetic core 421, the electromagnetic force moves the magnet 230 and the third blade 413 away from the magnetic field generator 420. It is noted, when the fourth protrusions 4136a abut against the second blocks 4121a along the negative X-axis direction, the third blade 413 pushes the second blade 412 away from the magnetic field generator 420 to a retracted position. Thus, the first blade 411, the second blade 412, and the third blade 413 substantially overlap one another, and the aperture 1010 is exposed to the mechanical shutter 40.

In this embodiment, the first, the second, and the third blade 411, 412, 413 can be stacked on one another when the aperture 1010 is exposed to the mechanical shutter 40. Thus the size of the shutter 400 of the camera module 10 is small.

In alternative embodiments, the mechanical shutter 400 may include only the first blade 411 and the third blade 413 but not necessarily to include the second blade 412. Accordingly, the first protruding portion 4113 can be slidably engaged in the second groove 4134 of the second engaging portion 4133. In application, the third blade 413 can be moved to cover or expose the aperture 1010.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. A mechanical shutter, comprising:
   a fixture defining a through hole;
   a blade group comprising:
      a first blade arranged in the through hole and mounted on the fixture,
      a second blade slidably mounted on the first blade, and
      a third blade slidably mounted on the second blade,
   a magnet attached to the third blade; and a magnetic field generator mounted on the fixture and spatially corresponding to the magnet, the magnetic field generator configured for applying a magnetic field to the magnet, such that the magnet and the magnetic field generator cooperatively move the blade group between an extended position where the second blade and the third blade slide away from the first blade, and a retracted position where the first blade, the second blade and the third blade substantially overlap each other.

2. The mechanical shutter of claim 1, wherein the blade group further comprises:
a first engaging portion protruding from the second blade and having a first groove defined therein;
a first elongated protruding portion protruding from the first blade, and the first protruding portion being slidably engaged in the first groove of the first engaging portion.

3. The mechanical shutter of claim 2, wherein the blade group further comprises:
a second engaging portion protruding from the third blade and having a second groove defined therein;
a second elongated protruding portion protruding from the second blade facing away from the first engaging portion, and the second protruding portion being slidably engaged in the second groove of the second engaging portion.

4. The mechanical shutter of claim 3, wherein a cross section of each of the first protruding portion and the second protruding portion is trapezoidal, and the first protruding portion tapers in a direction toward the first blade, and the second protruding portion tapers in a direction toward the second blade.

5. The mechanical shutter of claim 1, wherein the blade group further comprises:
a first block arranged on an end of the first blade adjacent to the magnetic field generator;
a first protrusion protruding from an end of the second blade facing away from the magnetic field generator, and the first block and the first protrusion are configured for cooperating to restrain movement of the second blade relative to the first blade in a first direction.

6. The mechanical shutter of claim 5, wherein the blade group further comprises:
a second protrusion protruding from an opposite end of the second blade adjacent to the magnetic field generator, and the first block and the second protrusion are configured for cooperating to restrain movement of the second blade relative to the first blade in a second direction opposite to the first direction.

7. The mechanical shutter of claim 1, wherein the blade group further comprises:
a second block arranged on an end of the second blade adjacent to the magnetic field generator;
a third protrusion protruding from an end of the third blade facing away from the magnetic field generator, and the second block and the third protrusion are configured for cooperating to restrain movement of the third blade relative to the second blade in a first direction.

8. The mechanical shutter of claim 7, wherein the blade group further comprises:
a fourth protrusion protruding from an opposite end of the third blade adjacent to the magnetic field generator, and the second block and the fourth protrusion are configured for cooperating to restrain movement of the third blade relative to the second blade in a second direction opposite to the first direction.

9. The mechanical shutter of claim 1, wherein each of the first blade, the second blade, and the third blade is rectangular, and the second blade is arranged between the first blade and the third blade.

10. The mechanical shutter of claim 1, wherein fixture is a lens barrel.

11. The camera module of claim 1, wherein the magnet is selected from a group consisting of a permanent magnet and an electromagnet.

12. The camera module of claim 1, wherein the magnetic field generator comprises a magnetic core, and an electromagnetic coil around the magnetic core.

13. A camera module comprising
a plurality of lenses;
a barrel receiving the lenses;
an image sensor facing the lenses; and
a mechanical shutter arranged inside the barrel, comprising:
a blade group including
a first blade mounted on an inner sidewall of the barrel,
a second blade slidably mounted on the first blade,
a third blade slidably mounted on the second blade,
a magnet attached to the third blade, and
a magnetic field generator configured for applying a magnetic field to the magnet, such that the magnet and the magnetic field generator cooperatively move the blade group between an extended position where the second blade and the third blade slide away from the first blade, and a retracted position where the first blade, the second blade and the third blade substantially overlap each other.

14. The camera module of claim 13, wherein the blade group further comprises:
a first engaging portion protruding from the second blade and having a first groove defined therein;
a first elongated protruding portion protruding from the first blade, and the first protruding portion being slidably engaged in the first groove of the first engaging portion.

15. The camera module of claim 14, wherein the blade group further comprises:
a second engaging portion protruding from the third blade and having a second groove defined therein;
a second elongated protruding portion protruding from the second blade facing away from the first engaging portion, and the second protruding portion being slidably engaged in the second groove of the second engaging portion.

16. The camera module of claim 15, wherein a cross section of each of the first protruding portion and the second protruding portion is trapezoidal, and the first protruding portion tapers in a direction toward the first blade, and the second protruding portion tapers in a direction toward the second blade.

17. The camera module of claim 13, wherein each of the first blade, the second blade, and the third blade is rectangular, and the second blade is arranged between the first blade and the third blade.

18. The camera module of claim 13, wherein the magnet is selected from a group consisting of a permanent magnet and an electromagnet.

19. The camera module of claim 13, wherein the magnetic field generator comprises a magnetic core, and an electromagnetic coil around the magnetic core.

20. A camera module comprising
a plurality of lenses;
a barrel receiving the lenses;

an image sensor facing the lenses; and a mechanical shutter comprising:

a blade group including a fixed blade fixedly mounted on an inner sidewall of the barrel, at least one movable blade slidably mounted on the fixed blade, a magnet attached to the at least one movable blade, and a magnetic field generator configured for applying a magnetic field to the magnet, such that the magnet and the magnetic field generator cooperatively move the blade group between an extended position where the at least one movable blade slides away from the fixed blade, and a retracted position where the at least one movable blade and the fixed blade substantially overlap each other.

* * * * *